United States Patent
Accapadi et al.

(10) Patent No.: US 10,108,453 B2
(45) Date of Patent: Oct. 23, 2018

(54) AVERTING LOCK CONTENTION ASSOCIATED WITH CORE-BASED HARDWARE THREADING IN A SPLIT CORE ENVIRONMENT

(71) Applicant: International Business Machines Corporation, Armonk, NY (US)

(72) Inventors: Mathew Accapadi, Cedar Park, TX (US); Grover C. Davidson, II, Round Rock, TX (US); Dirk Michel, Austin, TX (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 15/199,258

(22) Filed: Jun. 30, 2016

(65) Prior Publication Data

US 2018/0004571 A1    Jan. 4, 2018

(51) Int. Cl.
| | | |
|---|---|---|
| G06F 9/46 | (2006.01) | |
| G06F 9/48 | (2006.01) | |
| G06F 11/30 | (2006.01) | |

(52) U.S. Cl.
CPC ........ *G06F 9/4887* (2013.01); *G06F 11/3024* (2013.01); *G06F 11/3055* (2013.01)

(58) Field of Classification Search
None
See application file for complete search history.

(56) References Cited

U.S. PATENT DOCUMENTS

| | | | |
|---|---|---|---|
| 6,845,504 B2 | 1/2005 | Hua et al. | |
| 6,981,260 B2* | 12/2005 | Brenner | G06F 9/4881 718/100 |
| 7,458,076 B2* | 11/2008 | Swanberg | G06F 9/3851 712/E9.053 |
| 8,166,256 B2* | 4/2012 | Mealey | G06F 9/526 380/264 |
| 8,166,480 B2 | 4/2012 | Fontenot et al. | |

(Continued)

OTHER PUBLICATIONS

Huang et al.; "HaLock: Hardware-Assisted Lock Contention Detection in Multithreaded Applications", PACT '12, Sep. 19-23, 2012, Minneapolis, Minnesota, ACM 978-1-4503-1182-3, 10 pgs.

(Continued)

*Primary Examiner* — Van Nguyen
(74) *Attorney, Agent, or Firm* — Patterson + Sheridan, LLP

(57) ABSTRACT

Techniques are disclosed for managing lock contention in a multithreaded processing system. In one embodiment, a method includes tracking a current total amount of time that one or more software threads are prevented from execution due to a lock, a current utilization of one or more hardware threads in the processor, and a current number of dispatchable software threads. If the current total amount of time exceeds a predetermined threshold, the method includes performing a comparison of the current total amount of time, the current utilization, and the current number of dispatchable software threads to one or more past measurements. Based on the comparison, the method includes determining if reducing a number of active hardware threads will reduce a wait time. If reducing the number of active hardware threads will reduce the wait time, reducing the number of active hardware threads.

20 Claims, 7 Drawing Sheets

(56) References Cited

U.S. PATENT DOCUMENTS

| | | | |
|---|---|---|---|
| 8,245,236 B2 | 8/2012 | Brenner et al. | |
| 8,397,238 B2 | 3/2013 | Venkumahanti et al. | |
| 8,402,463 B2 | 3/2013 | Norton et al. | |
| 8,645,963 B2 | 2/2014 | Gupta et al. | |
| 8,719,828 B2* | 5/2014 | Lewis | G06F 9/4843 |
| | | | 718/101 |
| 8,762,613 B2 | 6/2014 | Zhang et al. | |
| 8,832,479 B2 | 9/2014 | Elnozahy et al. | |
| 8,838,940 B2 | 9/2014 | Tene et al. | |
| 2006/0031658 A1* | 2/2006 | Swanberg | G06F 9/3851 |
| | | | 712/1 |
| 2012/0284720 A1 | 11/2012 | Cain, III et al. | |
| 2012/0311605 A1* | 12/2012 | Olszewski | G06F 9/5094 |
| | | | 718/107 |
| 2013/0031553 A1 | 1/2013 | Hou et al. | |

OTHER PUBLICATIONS

Pan et al.; "Predicting the Cost of Lock Contention in Parallel Applications on Multicores Using Analytic Modeling", Proc. 5th Swedish Workshop on Multi-Core Computing, 2012, diva2:885991 <http://www.diva-portal.org/smash/record.sf?pid=diva2%3A885991>, 8 pgs.

International Business Machines Corporation, "Appendix P: List of IBM Patents or Patent Applications Treated as Related," Jul. 25, 2016, 2 pages.

ip.com, "Method and System for Reducing Spin Lock Contention," IP.com Number: 000197334, Jul. 2, 2010, 4 pages.

* cited by examiner

| Sample | Total Lock Wait Time | Thread Utilization | Dispatchable Software Threads |
|--------|---------------------|---------------------|------------------------------|
| 1 | W1 | U1 | D1 |
| 2 | W2 | U2 | D2 |
| 3 | W3 | U3 | D3 |
| 4 | W4 | U4 | D4 |
| 5 | W5 | U5 | D5 |

AVERTING LOCK CONTENTION ASSOCIATED WITH CORE-BASED HARDWARE THREADING IN A SPLIT CORE ENVIRONMENT

CROSS-REFERENCE TO RELATED APPLICATIONS

This application is related to U.S. patent application Ser. No. 15/199,275, titled "Averting Lock Contention Associated with Core-Based Hardware Threading in a Split Core Environment," filed concurrently herewith, the contents of which are incorporated herein by reference.

BACKGROUND

The present disclosure generally relates to processor utilization, and more specifically, to averting lock contention by controlling active hardware threads.

Modern processors can employ multiple cores for reading and executing program instructions. Multi-threading is the ability of a single core to execute multiple processes or threads concurrently. These threads or streams of execution can be employed by operating systems or hypervisors to execute programs. Hardware threading improves the throughput of a core, or the rate at which instructions pass through the core, by overlapping the hardware stalls associated with sequential streams of execution.

As the utilization of the workload increases, so that more and more hardware threads can be employed to improve throughput, the rate at which each software thread executes instructions may drop due to core resource contention. That is, the resources of the core are split in some way amongst the threads. Resource contention has a negative side effect: the per-thread performance is decreased and this can affect the serialization in the instructions. A typical result is increased lock contention: a software threads holds a lock and prevents another software thread from proceeding. The blocking thread must wait until the lock is released to proceed with execution. This reduces overall throughput and response time for the system as a whole.

SUMMARY

One embodiment presented herein discloses a method for averting lock contention by controlling active hardware threads. The method generally includes In one embodiment, a method includes tracking a current total amount of time that one or more software threads are prevented from execution due to a lock, a current utilization of one or more hardware threads in the processor, and a current number of dispatchable software threads. If the current total amount of time exceeds a predetermined threshold, the method includes performing a comparison of the current total amount of time, the current utilization, and the current number of dispatchable software threads to one or more past measurements. Based on the comparison, the method includes determining if reducing a number of active hardware threads will reduce a wait time. If reducing the number of active hardware threads will reduce the wait time, reducing the number of active hardware threads.

Other embodiments include, without limitation, a computer program product that includes a non-transitory storage medium having computer-readable program code that enables a processing unit to implement one or more aspects of the disclosed methods as well as a system having a processor, memory, and application programs configured to implement one or more aspects of the disclosed methods.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to the embodiments, some of which are illustrated in the appended drawings. It is to be noted, however, that the appended drawings illustrate only exemplary embodiments and are therefore not to be considered limiting of its scope, and may admit to other equally effective embodiments.

FIG. 7 illustrates an example table that stores a history of processing metrics.

DETAILED DESCRIPTION

Embodiments presented herein disclose techniques for averting lock contention in a multithreading processor. More specifically, techniques provide for a mechanism that adjusts the relative hardware thread priority based on a history of lock contention. In one embodiment, a first mechanism tracks the time that a lock is blocking productive work for a thread. A second mechanism keeps history for multiple contented locks in a table. A third mechanism detects the beginning of a lock critical section and adjusts the hardware thread priority based on historic knowledge of lock behavior.

Another embodiment described herein correlates three metrics to determine if the number of hardware threads that software threads are dispatched upon should be reduced to improve throughput. The three metrics are the utilization of hardware threads, the software-runnable thread count, and the total lock wait time on the system.

Figure 1:
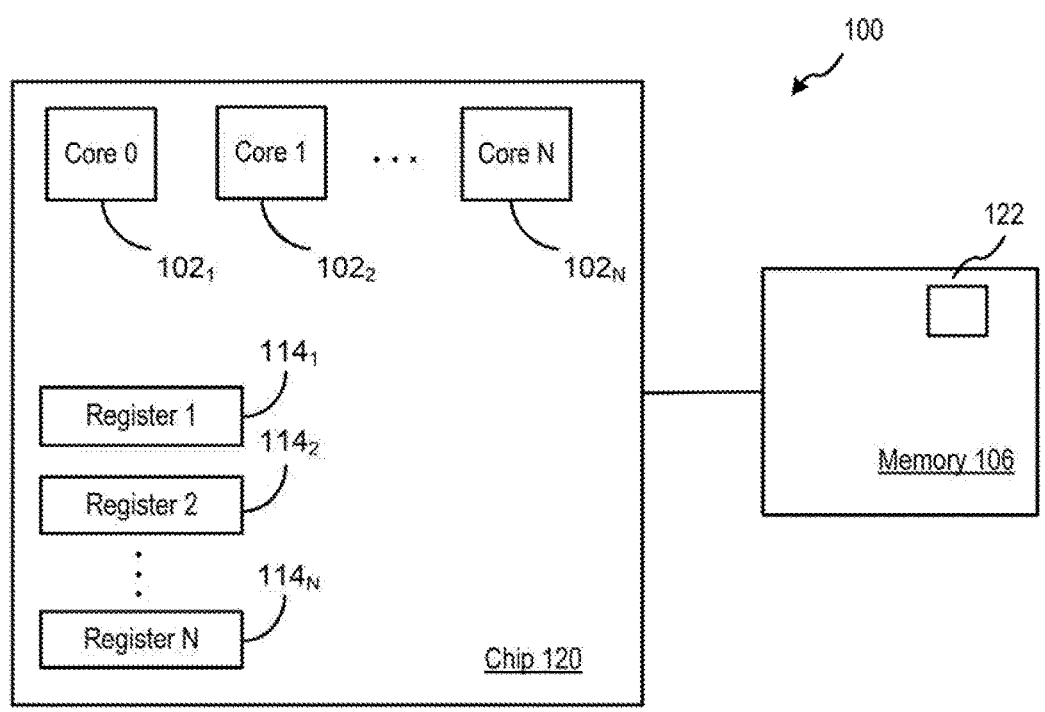
FIG. 1 illustrates an example multi-core processor, according to one embodiment.

FIG. 1 illustrates a computer system 100 according to one embodiment. The computer system 100 includes a chip 120 that includes one or more processor cores 102, shown as Core 1, Core 2, ..., Core N. Embodiments described herein may utilize any number N of processor cores. In other embodiments, components of system 100 shown as on chip 120 may be located off the chip, and components of system 100 shown as off chip 120 may be located on the chip.

Computer system 100 also comprises memory 106. Memory 106 may comprise a random access memory (RAM), a read-only memory (ROM), an erasable programmable read-only memory (EPROM or Flash memory), an optical storage device, a magnetic storage device, or any suitable combination of the foregoing. Memory 106 is illustrated off of chip 120 here, but memory 106 may also be located on chip 120 in other embodiments. Memory 106 is operable to store data for operations described herein. As one example, memory 106 can store tables 122. Various data is stored in tables for operations described herein, and these tables can comprise tables 122 stored in memory 106.

Computer system 100 also comprises registers 114. Embodiments described herein may utilize any number P of registers 114, and each register 114 may be any length. Registers 114 store bits of information that can be read out or written. Registers 114 may be general purpose registers used to store data for processing instructions. Registers 114 may also store addresses associated with locks as described in embodiments below.

Figure 2:
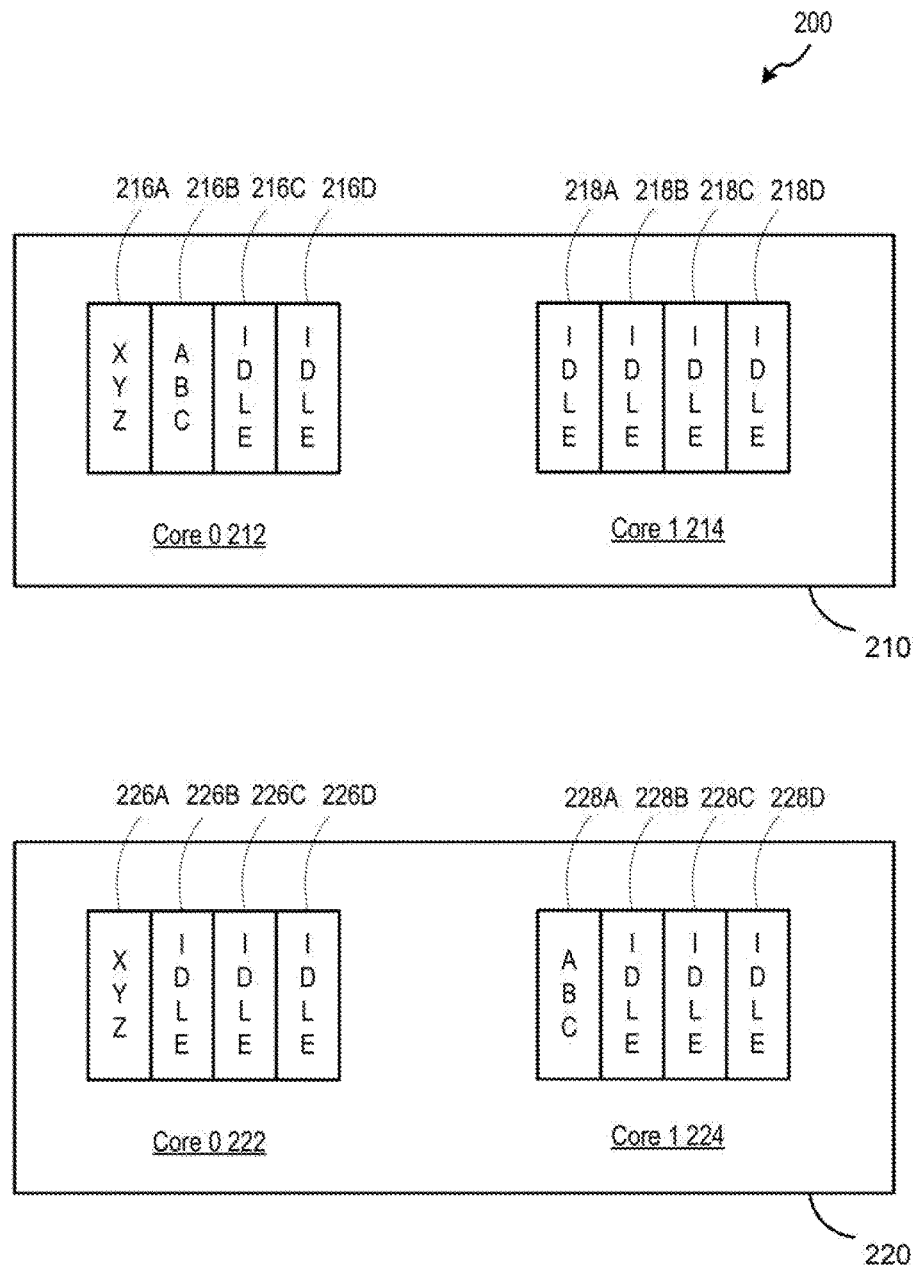
FIG. 2 illustrates an example multi-core approach for a two-core system or partition.

FIG. 2 illustrates a multi-core approach for a two-core system or partition. Processor 210 comprises two cores in this example, Core 0 212 and Core 1 214. Any number of cores may be used in other embodiments; two cores are illustrated here as an example. Core 0 comprises four hardware threads 216 in this example, labeled threads 216A-216D. Core 1 also comprises four hardware threads 218, labeled threads 218A-218D. In this example, the operating system has dispatched two software threads, labeled thread abc and thread xyz, on hardware threads on the same core. This is an example of an unoptimized case. Both software threads are dispatched on hardware threads of Core 0 212. Therefore, these software threads will share the resources of Core 0 212. Core 1 214, on the other hand, is entirely idle (no software threads are dispatched on the hardware threads of Core 1 214).

FIG. 2 further illustrates processor 220, which comprises two cores, Core 0 222 and Core 1 224. Any number of cores may be used in other embodiments. Core 0 comprises four hardware threads 226 in this example, labeled threads 226A-226D. Core 1 also comprises four hardware threads 228, labeled threads 228A-228D. In this example, the operating system has dispatched two software threads, labeled thread abc and thread xyz, on hardware threads on different cores. This is an example of an optimized case. The software threads abc and xyz are dispatched on different cores, and therefore do not have to compete with other software threads for the resources of the core. In most cases, the optimized case of processor 220 provides better speed of execution for the two software threads than the unoptimized case of processor 210.

The examples above illustrate two software threads dispatched for processing on the cores. As the utilization of the processor workload increases, more hardware threads can be employed to improve throughput. However, in general, the rate at which each software thread executes instructions will drop due to core resource contention. That is, the software threads compete for the resources of the core. The performance of each (or some) individual software thread may drop, but because more hardware threads are utilized, more overall work is done in a given amount of time. Contention can cause a negative side effect when the serialization in the software is affected by the decreasing per-thread performance. A typical effect of this phenomenon is increased lock contention.

Lock contention occurs when a software thread holds a lock that prevents another software thread from proceeding. For example, a first software thread may be accessing stored data to process an instruction. The lock prevents a second software thread from altering the data until the first software thread has completed execution. The second thread is therefore blocked from execution. The blocking thread must wait until the lock is released to proceed with execution. The blocking can be active, such as a spin lock. A spin lock is a lock that causes a thread trying to acquire the lock to wait in a loop ("spin") while repeatedly checking if the lock is available. The blocking thread can also be passive, such as by being undispatched so that another software thread can potentially be dispatched that is not blocked on the lock. In either case, overall throughput is reduced as well as response time for the processing system as a whole.

Lock contention tends to be statistical in behavior. That is, the likelihood that a contention occurs is related to how long a lock is held to perform an operation (hold time) and the number of active threads.

Figure 3:
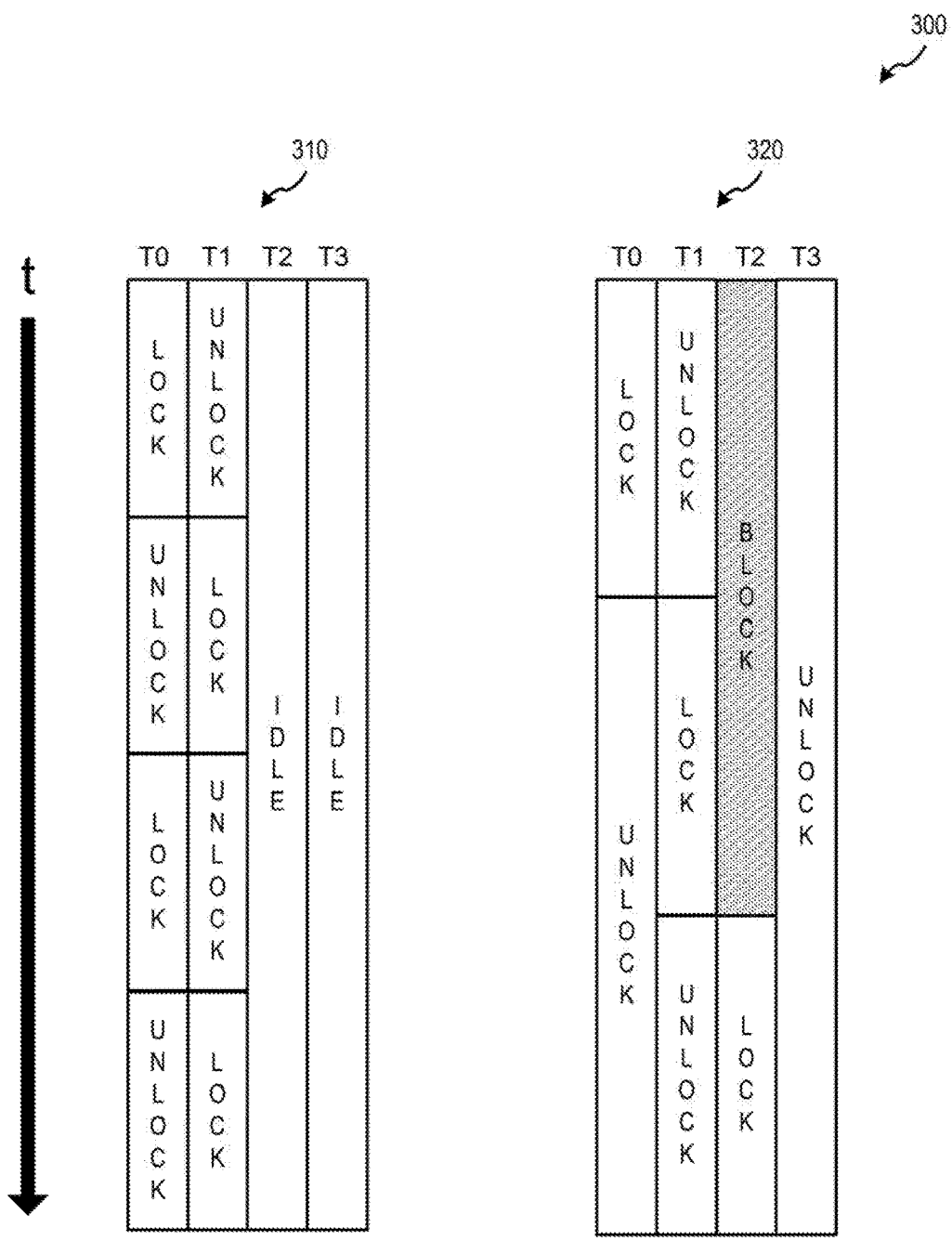
FIG. 3 illustrates an example of lock contention in multithreading processor cores, according to one embodiment.

FIG. 3 illustrates a version of lock contention in a multi-threading environment. Time moves downward in the figure as shown by the arrow on the right side. Core 310 comprises four hardware threads (T0, T1, T2, and T3). In core 310, two hardware threads are currently active (T0 and T1). In the duration of time illustrated, four operations under lock are performed by hardware threads T0 and T1. Hardware threads T2 and T3 remain idle during the duration of time shown.

Core 320 illustrates four active threads on the core (T0, T1, T2, and T3). With four active threads, the time under the lock increases because the threads are sharing the resources of the core. That is, the individual operations will take longer to execute than individual operations executing in core 310 because there are generally more active operations at a given time in core 320. The number of lock operations in the same time period illustrated in the figure is reduced to three. The existence of four threads can thus result in additional statistical lock acquires per unit time. Said another way, because more threads are in operation at a given time, more locks may be in use at the given time. In fact, as illustrated in core 320, there is now contention on hardware thread T2 where a software thread becomes blocked due to the lock(s) in hardware threads T0 and/or T1. The blocked software thread is shaded in FIG. 3.

A combination of three distinct mechanisms can adjust the relative hardware thread priority based on a history of lock contention. Adjusting the priority can reduce lock contention compared to the unadjusted scenario. First, a mechanism tracks the time that a lock is blocking another thread from performing productive work. Second, a mechanism stores a history for multiple contended locks. Third, a mechanism detects the beginning of a lock operation and adjusts the hardware thread priority based on knowledge of the past behavior of the lock. These mechanisms are discussed in further detail below.

Figure 4:
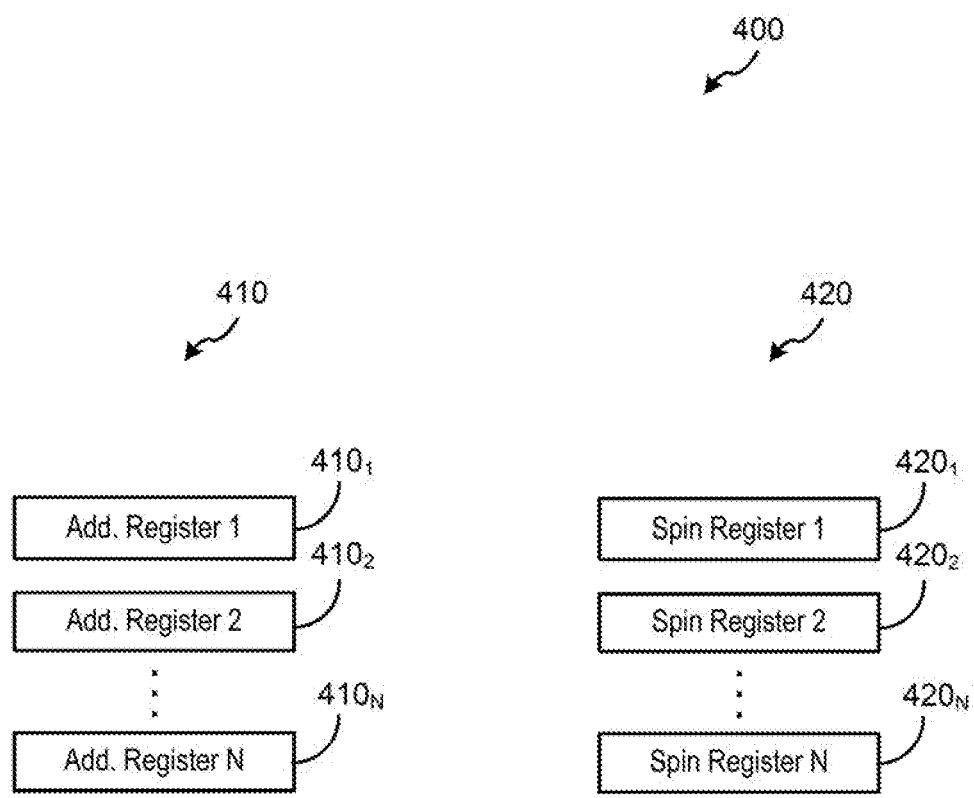
FIG. 4 illustrates an example of a time tracking mechanism, according to one embodiment.

FIG. 4 illustrates an example embodiment of the first mechanism, time tracking mechanism 400, that tracks the time that a lock blocks another thread from execution. In this example embodiment, the lock is a spin lock. However, other types of locks may be implemented in other embodiments. The action of taking a lock begins with a load operation of a lockword. In some processor architectures, this is done with a specific set of instructions. One example is a lwarx (Load Word and Reserve Indexed) instruction. This instruction may be used in conjunction with a subsequent stwcx (Store Word Conditional Indexed) instruction to emulate a read-modify-write operation on a specified memory location. In other embodiments, an instruction type such as a compare_and_swap may be used. In either case, a hint bit can be set in the instruction to notify the processing system that the load operation is going to take a lock.

A hardware thread specific register is used in some embodiments to hold the most recent lwarx address that was obtained with a load that included the lock hint bit. In other words, when an lwarx instruction or other instruction is received that includes a lock hint bit, the address of the instruction is stored in a register. This register could be a register 114 such as described above with respect to FIG. 1. The hardware thread specific address registers are illustrated as registers $410_1$ to $410_N$ in FIG. 4.

FIG. 4 also illustrates per hardware thread spin time registers $420_1$ to $420_N$ as another component of time tracking mechanism 400. These registers could also be registers 114 as described above with respect to FIG. 1. When a thread receives an instruction that includes a lock, such as an lwarx instruction, the address of the instruction is stored in a register 410 and an associated spin time register 420 is set to zero. Thereafter, if another instruction is received that attempts to access an address associated with a lock (stored in the address registers 410), that instruction will be blocked due to the lock. When an instruction is blocked, a count in the associated spin time register 420 is increased. The count stored in the spin time register 420 can be a simple count of time or a count of processor cycles. The count stored in the spin time register 420 tracks how long an instruction is blocked due to the associated lock.

When the operation performed under the lock is complete, the lock is cleared. In some embodiments, another hint bit in an instruction, such as a hint bit in a store instruction, notifies the processing system that the operation under lock is complete and clears the lock. An unlock operation clears the lock. After the unlock operation is complete, the count associated with the spin time register 420 is stopped. Any spin time (designated by the count) stored in spin time register 420 associated with that lock is evaluated for addition to a lock spin history table for the hardware thread, described in further detail below.

As described above, the address registers 410 and spin time registers 420 track the addresses associated with a processing lock and how long the lock is blocking another thread from processing. In some embodiments, if the spin time for an address meets or exceeds a predetermined threshold, the address is stored in a lock spin history table. In other embodiments, all addresses associated with a lock may be stored in the lock spin history table.

Figures 5, 6:
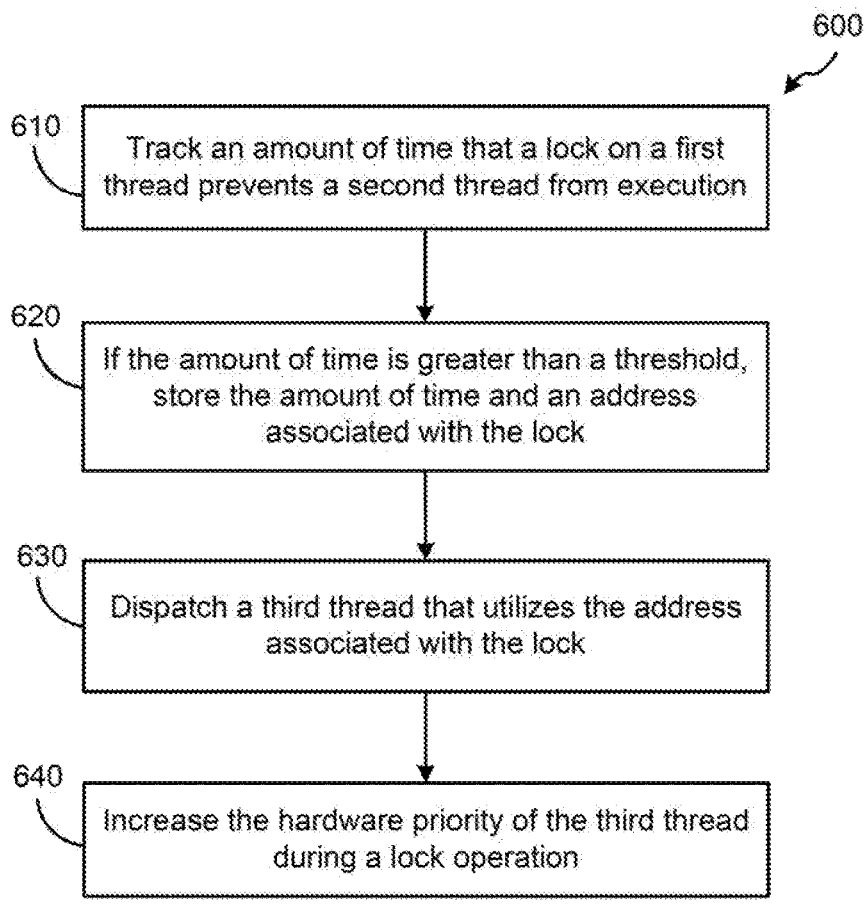
FIG. 5 illustrates an example lock spin history table, according to one embodiment.
FIG. 6 is a flowchart illustrating an example method for averting lock contention, according to one embodiment.

FIG. 5 illustrates an example lock spin history table 500 according to an embodiment. Lock spin history table 500 comprises lock addresses 510, shown as addresses A1 to A7, and total spin time 520 associated with each lock address, illustrated as spin time S1 to S7. When the lock address meets the criteria for addition to the lock spin history table 500, the lock address is added to table 500 in column 510. Further, the total spin time from spin time register 420 associated with the lock address is also added to table 500 in column 520. In some embodiments, lock spin history table 500 comprises a modest size. The number of highly contended locks for a given hardware thread may be a relatively small number, so a smaller, faster table 500 stored in memory may be utilized.

Additionally, in a virtualized computing environment, a lock spin history table 500 may be reset periodically. In one embodiment, table 500 can be reset at the beginning of each dispatch cycle for a given virtual processor on a hardware thread. Resetting the table keeps the history stored in the table from becoming stale and allowing behavior from the distant past to affect current processing. The table 500 could be reset at other times in other embodiments.

A simple method for managing the lock spin history table 500 is to use a first-in, first-out (FIFO) process. New entries dispatch older entries. Over a short time period, the table 500 will most likely not need to store a large number of lock addresses. Therefore, a table of a modest size and FIFO processing would be adequate for many implementations.

An alternative to FIFO processing would be a replacement strategy based on the total spin time.

With FIFO processing, locks are added one by one to an empty table at the beginning of a dispatch cycle for a virtual processor. Once the table is full, new locks displace old locks. As an example, if the table has seven entries as shown, with A1 being the oldest and A7 being the newest, a new entry (i.e., A8), will displace entry A1 in the table. If a predetermined threshold is used to add an entry to the table 500, the table 500 reflects locks with a specific amount of spin time.

The third mechanism detects the beginning of a lock operation and adjusts the hardware thread priority based on knowledge of the past behavior of the lock. A core 102 on a chip 120 may boost the hardware priority of a thread on the 102 core when the thread attempts to start a lock operation on an address in the lock history table. The lock address associated with the new instruction is compared to the lock addresses stored in lock spin history table 500. If the lock address is present in table 500, the hardware priority for the hardware thread is boosted for the duration of the lock operation. On the unlock operation, the priority of the hardware thread is reduced to its previous state. Therefore, during the critical section of the lock, the increased priority of the hardware thread provides the opportunity to reduce the number of processing cycles under lock. Fewer processing cycles under a lock operation reduces the statistical probability of a thread being blocked from processing, which increases the overall throughput of the processing system.

FIG. 6 is a flow diagram that illustrates an example method 600 for averting lock contention in a multithreaded processing environment. Although the method steps are described in conjunction with the systems of FIGS. 1-5, persons skilled in the art will understand that any system configured to perform the method steps, in any suitable order, falls within the scope of the present invention. In various embodiments, the hardware and/or software elements described above in FIGS. 1-5 can be configured to perform the method steps of FIG. 6.

Process 600 begins with step 610 where a time tracking mechanism tracks the amount of time that a lock on a first thread prevents a second thread from execution. As described in detail above, a hint bit in an instruction can notify the processor that the operation will take a lock on a specific address. A spin time register 420 associated with the hardware thread is set to zero. If a load to the same address occurs while the lock is active, a count begins and is stored in the spin time register 420. When the lock is cleared, the count stops in the spin time register 420.

The method proceeds to step 620. If the amount of time stored in the spin time register 420 is greater than a first threshold, the method stores the amount of time and an address associated with the lock. The amount of time and the address can be stored in a lock spin history table, such as table 500. If the lock spin history table 500 is full, the new entry dispatches an older entry in certain embodiments.

At step 630, a third thread that utilizes the address associated with the lock is dispatched to the processing core. The processing system can compare the lock address associated with the third thread to the lock addresses in the lock spin history table 500. If there is a match, that indicates that the address associated with the third instruction has taken a lock and blocked processing before, and therefore there is an increased probability that the lock will block another thread from processing.

At step 640, the processor increases the hardware priority of the third thread during a lock operation. Increasing the hardware priority of the third thread reduces the amount of time the lock is active. Reducing this time reduces the probability that another thread will be blocked from processing. After the lock operation is complete, the priority of the thread is returned to normal.

Thread Reduction Method for Averting Lock Contention

In another example embodiment, lock contention can be averted or reduced by reducing the number of active hardware threads. As discussed above with respect to FIG. 3, as more threads are active on a core, the time under the lock increases because the threads are sharing the resources of the core. That is, the individual operations will take longer to execute because there are generally more active operations at a given time in the core when more threads are active. The existence of additional threads can thus result in additional statistical lock acquires per unit time. Therefore, in certain circumstances, reducing the number of active hardware threads can reduce lock contention and result in more work being performed by the processing threads per unit time.

To determine when to reduce the number of active hardware threads, three metrics are collected and analyzed: the total lock wait time on the system, the utilization of hardware threads, and the number of dispatchable software threads. Under normal operation, the number of hardware threads employed for software thread dispatching is driven by the number of software threads that are currently dispatchable, or driven by an approximation of dispatchable software threads based on history. In this embodiment, the number of active hardware threads is determined by analyzing the three metrics.

FIG. 7 illustrates an example table 700 that stores a history of three metrics. Column 710 is a sample number used to identify the samples. Over time, samples of the three metrics are accumulated. Samples may be collected at a predetermined interval, or at any appropriate interval. Column 720 is the total lock wait time on the system, denoted as W1 to W5 for the associated sample. Lock wait time can be tracked in a number of ways. A hardware-based mechanism with hint bits in the instruction set may be used to track the wait time for threads that are blocked. Hint bits in instructions can notify the processing system when a lock is taken and when a lock is released. Time can be tracked while the lock is active, for example with a spin register as described above. Lock wait time could also be recorded by calls to a kernel application programming interface (API).

Column 730 stores the utilization of the hardware threads on the system for each sample, denoted as U1 to U5 for the associated sample. Many processing systems keep track of the utilization of the hardware threads as a routine metric, so that the processing system can increase or decrease the number of hardware threads as needed. Column 740 stores the number of dispatchable software threads for each sample, denoted as D1 to D5. These are also routinely tracked so that the processing system can operate efficiently, and increase or decrease resources as needed.

Over time, samples of the three metrics are accumulated and stored in table 700. As thread utilization increases, the total lock wait time may increase, because more active threads result in more lock contention. When the total lock wait time exceeds a predetermined threshold, the sample is compared to similar samples from the past to determine if reducing the number of active hardware threads may reduce total wait time. If reducing the threads will reduce total wait time, the number of active hardware threads is reduced until the next sample accumulation time. If the new sample shows reduced lock wait time over the previous sample, the reduction in active hardware threads is preserved for a certain number of samples. Samples then continue to accumulate and are stored in table 700. If, at a future point in time, the total lock wait time again exceeds the predetermined threshold, another comparison is performed to samples from the past. The algorithm continues with this iterative process of altering the number of active hardware threads to improve performance of the processing system.

Figure 8:
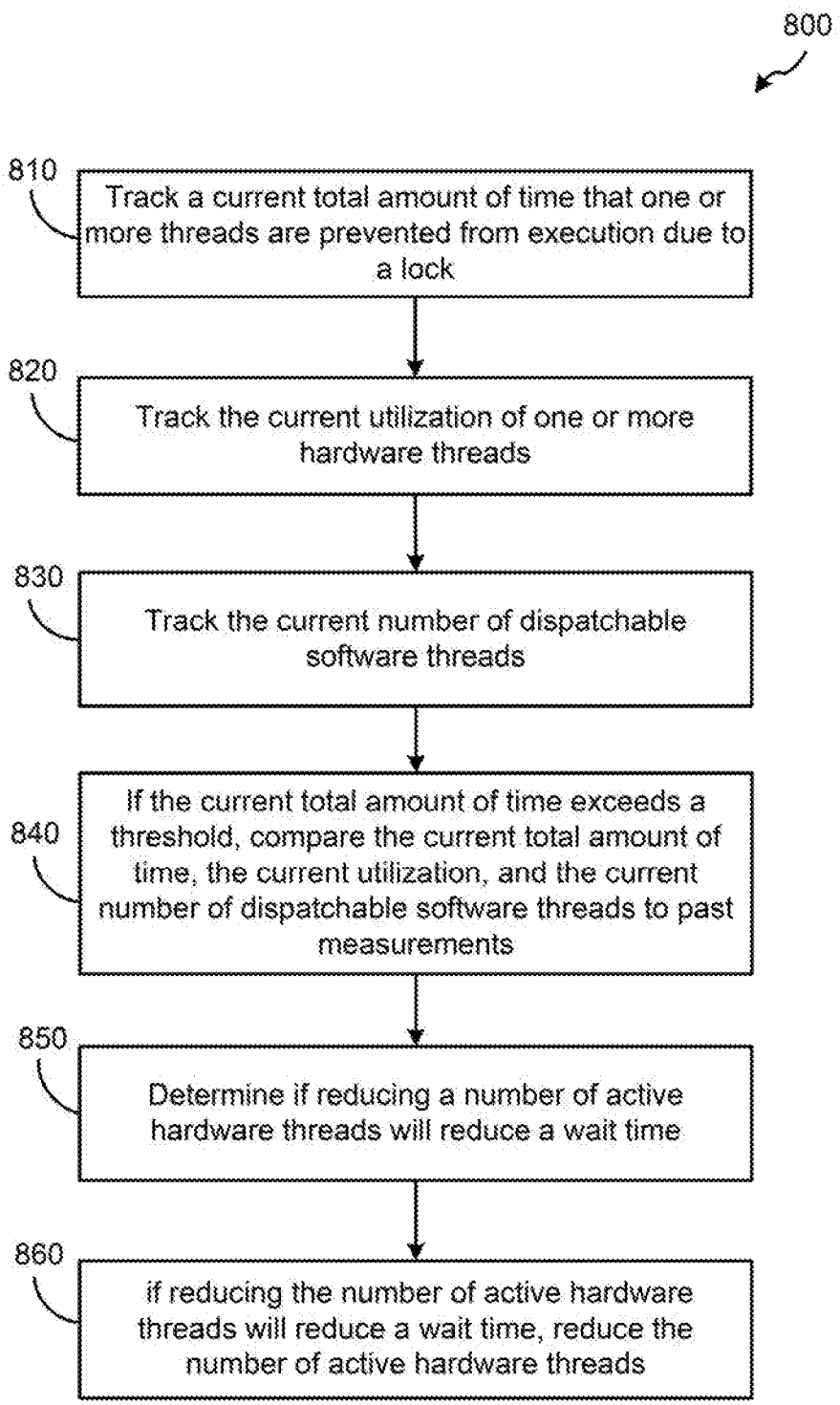
FIG. 8 is a flowchart illustrating an example method for averting lock contention, according to another embodiment.

FIG. 8 is a flow diagram that illustrates an example method 800 for averting lock contention in a multithreaded processing environment. Although the method steps are described in conjunction with the systems of FIGS. 1-3 and 7, persons skilled in the art will understand that any system configured to perform the method steps, in any suitable order, falls within the scope of the present invention. In various embodiments, the hardware and/or software elements described above in FIGS. 1-3 and 7 can be configured to perform the method steps of FIG. 8.

Process 800 begins with step 810 where the system tracks a current total amount of time that one or more software threads are prevented from execution due to a lock. A hardware-based mechanism with hint bits in the instruction set may be used to track the wait time for threads that are blocked in one embodiment, or lock wait time could also be recorded by calls to a kernel API. This metric can be stored in a table in memory, such as table 700, each time a sample is taken.

The method proceeds to step 820, where the processing system tracks the current utilization of one or more hardware threads in the processor. This metric can also be stored in a table in memory, such as table 700, each time a sample is taken.

The method proceeds to step 830, where the processing system tracks the current number of dispatchable software threads. This metric is routinely tracked in processing systems to allow the processing system to manage resource allocation. This metric can also be stored in a table in memory, such as table 700, each time a sample is taken.

At step 840, if the total amount of time from step 810 exceeds a predetermined threshold, the processing system performs a comparison of the total amount of time, the utilization, and the number of dispatchable software threads to past measurements. Samples of these three measurements are accumulated over time and stored in memory. When the total amount of time exceeds the threshold, the processing system is experiencing an amount of lock wait time that could ideally be reduced to increase performance. Therefore, the instant sample is compared to samples from the past that are stored in table 700. The instant sample is compared to similar samples. Similar samples may be determined in a variety of manners. For example, samples may be deemed similar if the utilization of hardware threads and the number of dispatchable software threads are identical. Or, samples may be deemed similar if the utilization of hardware threads and the number of dispatchable software threads are each within a range. Any suitable criteria may be used to determine whether past samples are similar to the instant sample.

At step 850, based on the comparison, the processing system determines if reducing a number of active hardware threads will reduce a wait time. That is, if the instant sample if similar to a past sample, and the past sample has a smaller number of active hardware threads and a reduced wait time, then reducing the number of active hardware threads may also reduce the wait time, just as it did for the past sample. The instant sample may be compared to multiple past samples or to one past sample, depending on how many similar samples are stored in the table and available for comparison.

At step 860, if reducing the number of active hardware threads will reduce the wait time, the processing system reduces the number of active hardware threads based on the comparison. The number of active hardware threads can be reduced until the next sample time. If the new sample time shows that the lock wait time is reduced compared to the previous sample time, the reduction in active hardware threads was successful and will be preserved for a number of cycles or samples. After the number of reduced cycles or samples is up, the number of active hardware threads can be increased again. Alternatively, further samples can be analyzed to determine if the number of active hardware threads should be reduced further or remain the same.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A method for managing lock contention in a processor, comprising:
    tracking, in a table stored in a memory, a current total amount of time that one or more software threads are prevented from execution due to a lock;
    tracking, in the table, a current utilization of one or more hardware threads in the processor, wherein each of the hardware threads form an execution stream on a processor core;
    tracking, in the table, a current number of software threads that are dispatched to the hardware threads for execution on the processor core;
    if the current total amount of time exceeds a predetermined threshold, performing a comparison of the current total amount of time, the current utilization, and the current number of software threads to one or more past measurements;
    based on the comparison, predicting that reducing a number of active hardware threads will reduce a wait time by:
        determining that the one or more past measurements comprise a smaller number of active hardware threads compared to a current number of active hardware threads; and
        determining that the one or more past measurements associated with the smaller number of active hardware threads comprise a reduced wait time for software threads compared to the current total amount of time; and
    if reducing the number of active hardware threads will reduce the wait time, reducing the number of active hardware threads.

2. The method of claim 1, wherein reducing the number of active hardware threads comprises reducing the number of active hardware threads for a predetermined number of processing cycles.

3. The method of claim 2, further comprising, after the predetermined number of processing cycles:
    increasing the number of active hardware threads; and
    tracking the current total amount of time that one or more software threads are prevented from execution due to a lock.

4. The method of claim 1, wherein performing the comparison comprises comparing the current utilization and the current number of software threads to one or more past measurements that are similar to the current measurements.

5. The method of claim 1, wherein a current total amount of time is tracked utilizing one or more hint bits in an instruction set.

6. The method of claim 5, wherein a first hint bit in a first instruction denotes a beginning of a lock operation, and a second hint bit in a second instruction denotes an end of the lock operation.

7. The method of claim 1, wherein the one or more software threads that are prevented from execution enter a low-priority spinning mode.

8. A computer program product for managing lock contention, the computer program product comprising a non-transitory computer-readable storage medium having computer-readable program code embodied therewith, the computer-readable program code executable by a processor to cause the processor to:
    track, in a table stored in a memory, a current total amount of time that one or more software threads are prevented from execution due to a lock;
    track, in the table, a current utilization of one or more hardware threads in the processor, wherein each of the hardware threads form an execution stream on a processor core;
    track, in the table, a current number of software threads that are dispatched to the hardware threads for execution on the processor core;
    if the current total amount of time exceeds a predetermined threshold, perform a comparison of the current total amount of time, the current utilization, and the current number of software threads to one or more past measurements;
    based on the comparison, predict that reducing a number of active hardware threads will reduce a wait time by:

determining that the one or more past measurements comprise a smaller number of active hardware threads compared to a current number of active hardware threads; and determining that the one or more past measurements associated with the smaller number of active hardware threads comprise a reduced wait time for software threads compared to the current total amount of time; and if reducing the number of active hardware threads will reduce the wait time, reduce the number of active hardware threads.

9. The computer program product of claim 8, wherein the computer-readable program code further causes the processor to:

reduce the number of active hardware threads for a predetermined number of processing cycles.

10. The computer program product of claim 9, wherein the computer-readable program code further causes the processor to, after the predetermined number of processing cycles:

increase the number of active hardware threads; and track the current total amount of time that one or more software threads are prevented from execution due to a lock.

11. The computer program product of claim 8, wherein performing the comparison comprises comparing the current utilization and the current number of software threads to one or more past measurements that are similar to the current measurements.

12. The computer program product of claim 8, wherein the computer-readable program code tracks a current total amount of time utilizing one or more hint bits in an instruction set.

13. The computer program product of claim 12, wherein a first hint bit in a first instruction denotes a beginning of a lock operation, and a second hint bit in a second instruction denotes an end of the lock operation.

14. The computer program product of claim 8, wherein the one or more software threads that are prevented from execution enter a low-priority spinning mode.

15. A system, comprising:

a processor; and a memory storing a program, which, when executed on the processor, performs an operation for managing lock contention, the operation comprising:

tracking, in a table stored in a memory, a current total amount of time that one or more software threads are prevented from execution due to a lock;

tracking, in the table, a current utilization of one or more hardware threads in the processor, wherein each of the hardware threads form an execution stream on a processor core;

tracking, in the table, a current number of software threads that are dispatched to the hardware threads for execution on the processor core;

if the current total amount of time exceeds a predetermined threshold, performing a comparison of the current total amount of time, the current utilization, and the current number of software threads to one or more past measurements;

based on the comparison, predicting that reducing a number of active hardware threads will reduce a wait time by:

determining that the one or more past measurements comprise a smaller number of active hardware threads compared to a current number of active hardware threads; and determining that the one or more past measurements associated with the smaller number of active hardware threads comprise a reduced wait time for software threads compared to the current total amount of time; and if reducing the number of active hardware threads will reduce the wait time, reducing the number of active hardware threads.

16. The system of claim 15, wherein reducing the number of active hardware threads comprises reducing the number of active hardware threads for a predetermined number of processing cycles.

17. The system of claim 16, the operations further comprising, after the predetermined number of processing cycles:

increasing the number of active hardware threads; and tracking the current total amount of time that one or more software threads are prevented from execution due to a lock.

18. The system of claim 15, wherein performing the comparison comprises comparing the current utilization and the current number of software threads to one or more past measurements that are similar to the current measurements.

19. The system of claim 15, wherein a current total amount of time is tracked utilizing one or more hint bits in an instruction set.

20. The system of claim 19, wherein a first hint bit in a first instruction denotes a beginning of a lock operation, and a second hint bit in a second instruction denotes an end of the lock operation.

* * * * *